Figure 1:
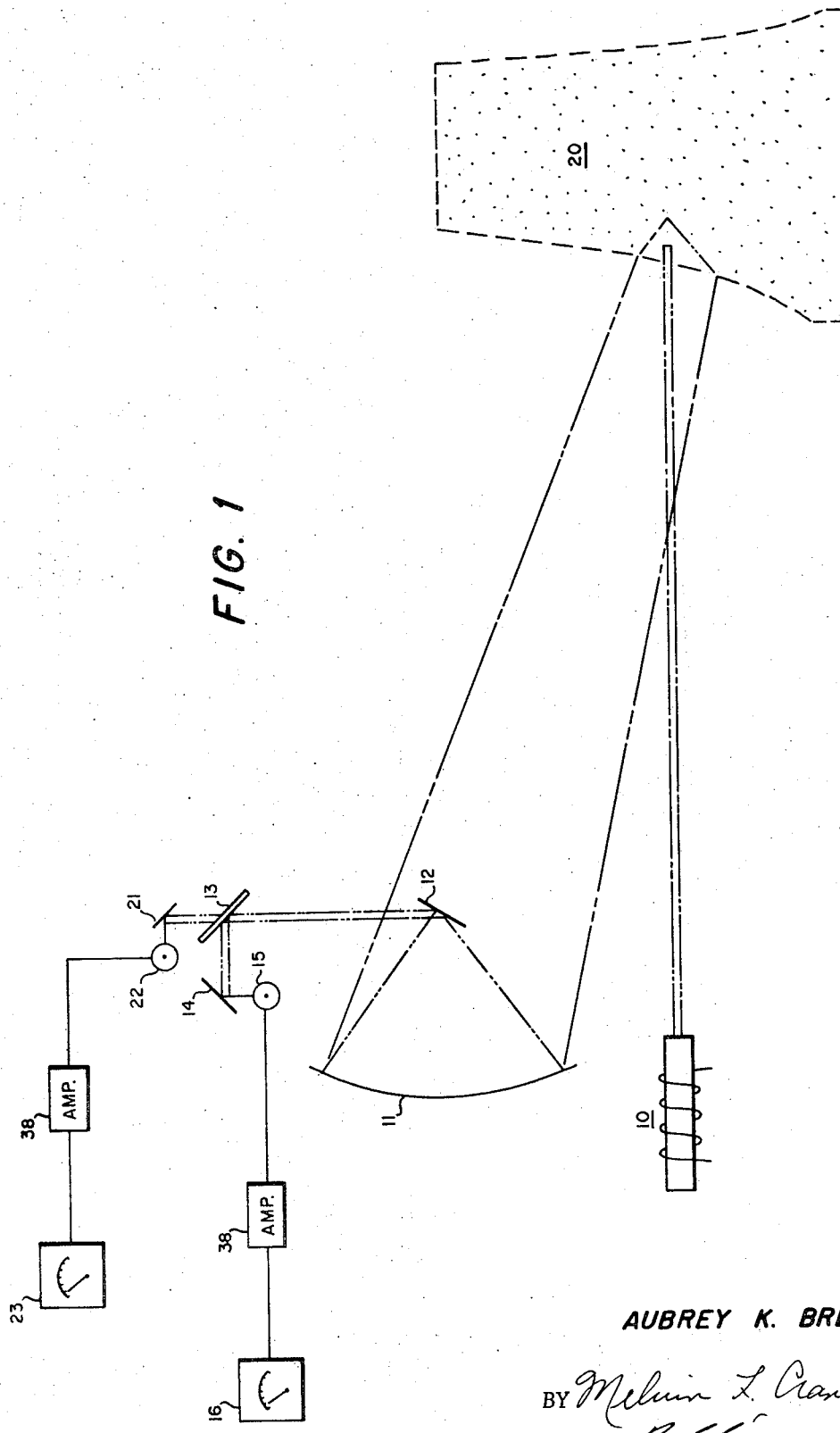

United States Patent

[11] 3,566,114

| [72] | Inventor | Aubrey K. Brewer<br>3247 38th St. N.W., Washington, D.C. 20016 |
|---|---|---|
| [21] | Appl. No. | 725,269 |
| [22] | Filed | Apr. 25, 1968 |
| [45] | Patented | Feb. 23, 1971 |

[54] METHOD AND MEANS FOR DETECTION OF MICROORGANISMS IN THE ATMOSPHERE
2 Claims, 2 Drawing Figs.

[52] U.S. Cl. .................................................. 250/71.5, 250/83.3
[51] Int. Cl. .................................................. G01j 3/28
[50] Field of Search .......................................... 250/71.5, 71, 83.3 (UV)

[56] References Cited
UNITED STATES PATENTS

| 2,237,193 | 4/1941 | Mobsby | 250/83.3 |
| 2,401,410 | 6/1946 | Brown | 250/71 |
| 2,554,321 | 5/1951 | Bray | 250/83.3 |

OTHER REFERENCES

Eisenthal et al.: " Laser Induced Luminescence" IBM Technical Disclosure Bulletin Vol. 8, No. 7 Dec. 1965 p. 983

*Primary Examiner*—Rodney D. Bennett, Jr.
*Assistant Examiner*—Daniel C. Kaufman
*Attorneys*—R. I. Tompkins, M. L. Crane, A. L. Branning and R. J. Erickson

ABSTRACT: This disclosure is directed to a method and apparatus for detecting and identifying bacteria within the atmosphere. A suitable ultraviolet light is directed into the atmosphere. The light will be reflected back by nonliving substances, and living organisms such as bacteria will be excited and produce fluorescent light. Means adjacent to the light source is provided to receive and differentiate between the reflected and fluorescent light. Bacteria of different classes will produce their characteristic wavelength; therefore, bacteria of different classes may be determined.

INVENTOR
AUBREY K. BREWER

METHOD AND MEANS FOR DETECTION OF MICROORGANISMS IN THE ATMOSPHERE

The invention described herein may be manufactured and used by or for the Government of the United States of America for governmental purposes without the payment of any royalties thereon or therefor.

This invention is directed to a method and apparatus for the long range detection of bacteria within the atmosphere.

Heretofore bacteria has been detected in a controlled environment by culturing for extended periods of time as well as by other controlled diagnosis and pathological means. Also various methods and different types of apparatus have been used to determine the presence of objects within the atmosphere and their distances from the detection instrumentation to the object. At present, there is no known method available for long range detection and identification of biological particulate within the atmosphere.

It has been determined that micro-organisms and many of their gross components emit fluorescent radiation in a unique and characteristic fashion when irradiated by electromagnetic radiation of appropriate wavelengths. Organic substances such as bacteria are comprised of amino acids. These acids contain a large number of double bonds in their molecular structure. Each of these bonds when excited by suitable ultraviolet wavelengths will be raised to an excited state. In about $10^{-8}$ seconds after irradiation, the bond returns to the normal state with the emission of ultraviolet radiation with a wavelength spectrum covering in generally peak intensity at about 500 Angstroms longer wavelength than the exciting radiation with a distribution spread of approximately 300 Angstroms on each side of the maximum. Since the energy state at each double bond is determined by the adjacent atomic arrangement in the molecular structure, the fluorescent frequencies will be specific for each organism. From the above, it will be seen that the emission of fluorescent light will be indicative of the presence of bacterial-type materials while the ratios of the various fluorescence wavelengths to each other as a function of the exciting wavelength will be indicative of specific bacterial species.

In has been determined that bacteria being composed of amino acids containing many double bonds possess a high fluorescent efficiency and thus is distinguishable from organic-type material such as oil fuels in general in which the concentration of double bonds is far lower. Therefore, detecting and distinguishing between bacterial types, of detecting and distinguishing between bacteria in general, or organic particles, and the distinguishing between all organic materials including chemical warfare agents from nonorganic particulate matter in the atmosphere may be brought about by the method and apparatus of the present invention.

The intensity of fluorescent light emission is a function of the number of fluorescent bonds in the area exposed to the exciting ultraviolet light. The intensity of backscatter light is a function of the number of scattering particles in the area. The ratio of backscatter to fluorescent light will thus be very different between a bacterial cloud cover, a smoke cloud cover and a chemical cloud. Bacteria composed of amino acids has a high fraction of double bonds hence the fluorescent efficiency is high such as between 0.1 and 0.9 which has been predominantly shown to be nearer 0.3. In contrast, soot and smoke will contain only a low concentration of double bonds. The same is true for many chemical warfare agents. In these cases, the fluorescent efficiency is below 0.1. From the above, it is seen that the ratio of backscattered light to fluorescent light differs markedly from bacteria to smoke and to chemical agents. This ratio combined with the fluorescent spectrum provides a means for identification of the various elements within the atmosphere.

The method and apparatus of this invention provides a rapid, long range means for the discrimination of organic substances in the air and differentiation of bacterial-type materials in contrast to oil fumes and nonliving substances.

The invention may be made to provide a continuous reading of the concentration of organic particles in the air as well as a concentration of nonorganic particles which come under the heading of dust, salt crystals and the like.

It is therefore an object of this invention to provide a procedure which requires only a few minutes for a reliable identification of bacteria within the atmosphere.

Another object is to provide a method and system for identifying bacteria within the atmosphere and in the presence of other particulate matter within the atmosphere.

Yet another object is to provide a method and apparatus for warning against an influx of large amounts of bacteria in the atmosphere.

Still another object is to provide a continuous reading of the concentration of organic particles in the atmosphere as well as the concentration of nonorganic particles therein.

Figure 2:
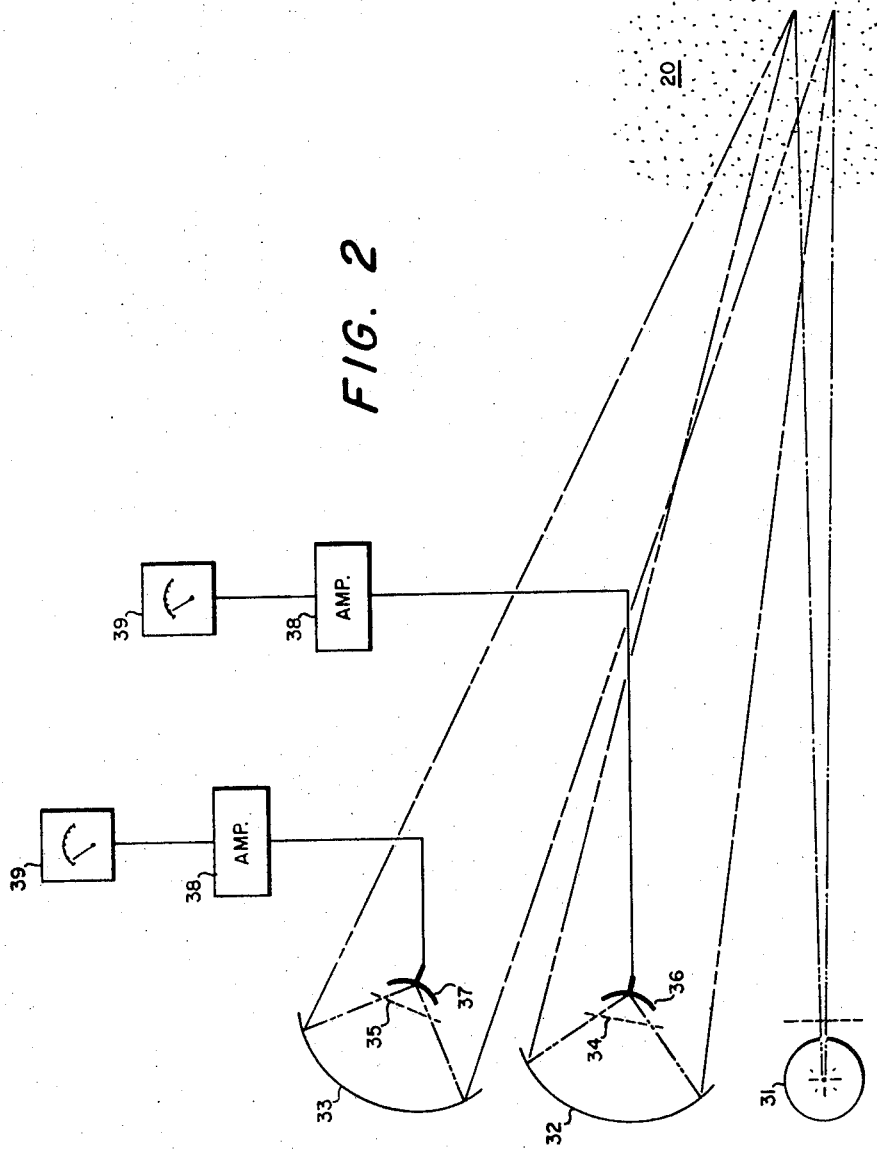

Other objects and advantages of the present invention will hereinafter become more fully apparent from the following description of the annexed drawings, wherein:

FIG. 1 illustrates a light source, light reflector and separate light receiver apparatus including separate indicators; and FIG. 2 illustrates a light source including separate light reflectors, light collectors, and light receivers.

The method and apparatus of the present invention includes the use of a light source that directs a light beam into the atmosphere. The light beam is intercepted by the particulate matter in the air, scattered and absorbed by the particulate matter such as dust particles, etc. Part of the light will be reflected back toward the source and part of it will be scattered at the same wavelength as the exciting light source. Organic material such as bacteria will also absorb and scatter light. The light absorbed by the bacteria will excite the double bonds inducing them to emit fluorescent light having a delay of the order of $10^{-8}$ seconds and a wavelength about 500 ± 300 A. longer than the exciting light. Suitable light-receiving and recording means are positioned to receive both the scattered light from the particulate matter and the fluorescent light emitted by the bacteria. Suitable filters are used to pass the light scattered by the particulate matter to one detector and the fluorescent light emitted by the bacteria to another detector; therefore, the different light may be detected and recorded.

Now referring to the drawings, there is shown by way of illustration an apparatus suitable for carrying out the teachings of the present invention. A light source 10 is positioned in such a manner as to direct a light beam into the atmosphere. Adjacent to the light source is located a light collector lens 11 which receives the light scattered back from the particulate and organic matter in the atmosphere. The light from the collector lens is directed onto a grating 12 which collimates and focuses the light onto a partially reflective mirrored filter 13 which passes light of particular wavelength and reflects light of a different wavelength. The light reflected from the partially reflective filter is directed onto a grating 14 which collimates the light and focuses the light onto a photomultiplier tube 15 which directs the signal into a recorder 16. The light that passes through the partially reflective filter is directed onto a grating 21 which collimates and focuses that light onto a second photomultiplier tube 22. The signal from the photomultiplier tube 22 is directed to a recorder 23. The partially reflective filter 13 is chosen such that the light having a wavelength the same as the source which is scattered back from the particulate matter passes therethrough onto the grating 21 and the fluorescent light which is emitted by the bacteria, and is incident on the light collector, is directed onto the filter 13 and is reflected therefrom onto the grating 14. Thus, the fluorescent light emitted by the bacteria is detected by one detector recorder whereas the light having the same wavelength as the light source is directed onto a different detector recorder. Thus, it is possible to determine the presence of bacteria by use of the described apparatus and to discriminate bacteria from other particulate matter in the air.

FIG. 2 is directed to a system having a light source 31 with two light collector and reflector elements 32, 33 positioned nearby. The light reflector elements each reflect the light therefrom through an associated filter 34,35 onto a photomultiplier tube 36,37 which detects the light and produces a signal in accordance with the incident light. The light output from the photomultiplier tube is then amplified by separate suitable amplifiers 38 and directed to separate records 39 where it is recorded. The filters placed in front of the photomultiplier tube through which the light is reflected by the reflector is chosen such that particular wavelengths of light will pass therethrough whereas light having other wavelengths will be blocked by the filter. One of the filters is chosen such that it will pass light having the same wavelength as the light source which is directed into the atmosphere and the other filter is chosen such that the light passing therethrough will have a wavelength the same as the fluorescent light which is emitted by the organisms within the atmosphere. Thus, the light system of the apparatus as shown by FIG. 2 has two complete similar systems whereas the apparatus as shown by FIG. 1 operates with only one light collector lens with separate detector-recorders.

It is to be understood that the basic invention is in no way limited by the two devices illustrated in FIGS. 1 and 2 as described above. Many modifications of the system are possible. To illustrate, the grating 12 in FIG. 1 may be replaced by a semireflecting or by a split mirror which divided the light into two equal parts, half going to photocell 22 and half to photocell 15. Again a very simple device can be made by replacing the grid 13 with a solid fine line grid or by a quartz prism which will break the collected light up into a spectrum such that photocells 15 and 22 can be mounted to receive directly the resolved light from backscatter and from the micro-organism fluorescence.

The exciting light source may be selected from various types, however, it is necessary to employ a light having a wavelength which is not appreciably absorbed in the atmosphere. It has been determined that a satisfactory light is one having a wavelength from about 2500 Angstroms to about 2900 Angstroms. Thus, it is desirable to employ frequencies below 2900 Angstroms and it has been determined that the 2537 Angstrom line of mercury, for example, will induce fluorescence in almost all organic materials and the fluorescent light maximum is from 210 Angstroms to 700 Angstroms longer than the exciting light. It is desirable therefore to use an exciting frequency which will shift the fluorescent frequencies to as short a wavelength as possible. From the above there will be seen that the 2550 to 2800 Angstrom range is most effective while the 2650 Angstrom range is near ideal. Thus with a light having a wavelength of 2650 Angstroms much of the fluorescence produced by the organic materials will be below 3000 Angstroms and an appreciable fraction will be below 2900 Angstroms where the atmosphere has negligible background. It is desirable to employ a light source of essentially monochromatic light wherein the ideal source is a laser giving an intense pulse of ultraviolet light in the suitable range. A neodynium laser pulsing on a higher harmonic to emit 2650 Angstroms is ideal. This source can be pulsed to send out a ray of light up to 100 meters in length with an intensity in the order of megawatts. However, condensed discharges in the nobel gases with suitable filters may be utilized.

In operation of the apparatus, a light having a wavelength of about 2650 Angstroms is projected into the atmosphere. The light beam is intercepted by the particulate matter and the organic matter in the atmosphere wherein the light is both scattered and absorbed. The scattered light from the particulate matter will have the same wavelength as the exciting light and will be reflected back onto the light-collector lens and then directed to a photomultiplier wherein the signal from the photomultiplier is recorded by the recorder. Likewise the light beam projected into the atmosphere causes the bacteria or organic material to fluoresce wherein the fluorescent light is incident on the light collector lens and subsequently projected into a photomultiplier wherein the signal is directed to a recorder.

The quantity of fluorescent light incident on the collector will depend on a number of factors. These may be expressed as $$i=cKEnf\frac{a}{4\pi L^2}$$

where $i$ is the light received at the collector measured in watts; $c$ is a term embracing certain intangibles to be discussed later; $K$ is the fluorescing efficiency; $E$ is the energy in watts in the light passing through the region containing the bacteria; $f$ is the fraction of the light intercepted by bacteria in passing through 1 cubic meter of air; $n$ is the number of cubic meters of air on which the count is to be made; $a/4\xi L^2$ is the area of the collector compared to the area of a shell where $L$ is the distance from the bacterial cloud to the collector.

An example of the fluorescent current that will be picked up at the collector is given below. Let $K$ be 0.1 to 0.9 for organic materials; let $E$ be 1 watt; let $f=10^{-6}$; let $n=10$; let $L=1$ km; and let $c=1$ thus:

$i=1\times 0.1\times 1\times 10^{-5}\times 10^{-7}=10^{-13}$ watts.

Detection is possible down to $10^{-15}$ watts. Thus with 1 watt input a relatively low bacterial density can be easily observed at 1 km distance. Using a laser input of $5\times 10^5$ watts a signal of $5\times 10^{-8}$ watts should be possible. This is $5\times 10^7$ units above background.

It has been determined that bacteria produces a particular record trace due to the fluorescence excited therefrom by the incident light. Therefore by comparing the records produced by the fluorescent light of the bacteria within the atmosphere one can determine the type of bacteria which is included in the atmosphere.

Since the system uses a light source which may be a pulsed laser giving a light beam of a particular pulse and one which is capable of being projected considerable distance, it is possible to determine the time of passage of the light to the bacteria and back again and thus define the distance of the bacterial cloud from the source. Thus, the system could be operated for determining distance as well as determining the presence of bacteria within the atmosphere.

Obviously many modifications and variations of the present invention are possible in the light of the above teachings. It is therefore to be understood that within the scope of the appended claims the invention may be practiced otherwise than as specifically described.

I claim:

1. A method of determining the presence of bacteria in the atmosphere which comprises:

projecting a light beam having a wavelength of from about 2500 Angstroms to about 2900 Angstroms into the atmosphere to induce fluorescence within bacteria in the atmosphere, and scattered light due to particulate matter within the atmosphere;

receiving said fluorescent and scattered light by a light reflector;

reflecting said light through at least one light filter to separate said light due to fluorescence from said scattered light;

directing said separated light onto separate light detectors to produce separate electrical output signals corresponding to the intensity of said fluorescent light and said scattered light;

recording said electrical signals to present a record representative of the intensity of said fluorescent and scattered light; and whereby the record of said fluorescent light indicates the presence of bacteria and the record of said scattered light indicates the presence of particulate matter in the atmosphere.

2. A method as claimed in claim 1 in which:

said light detected due to bacteria is analyzed to differentiate between different bacteria types.